May 29, 1923.
W. H. BECKER
INDIVIDUAL RECORDING DEVICE FOR SHIPPING PURPOSES
Filed Aug. 2, 1919
1,456,583
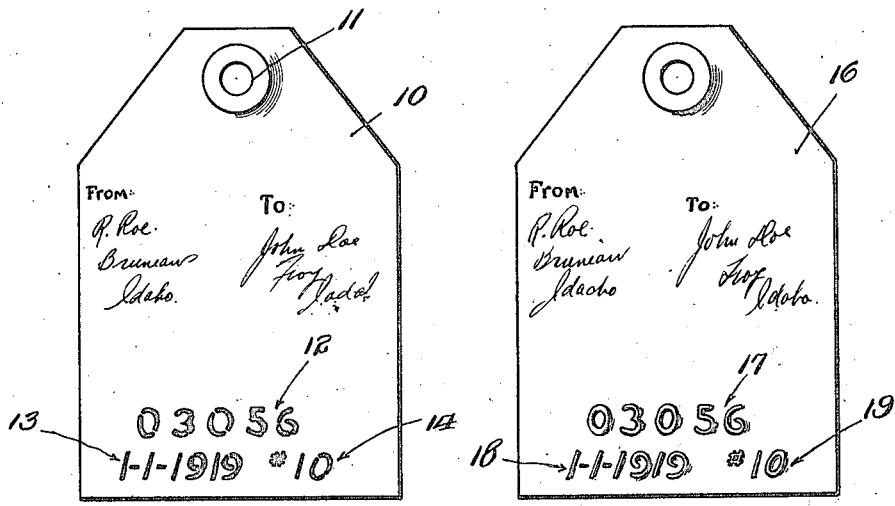

Patented May 29, 1923.

1,456,583

UNITED STATES PATENT OFFICE.

WALTER H. BECKER, OF BRUNEAU, IDAHO.

INDIVIDUAL RECORDING DEVICE FOR SHIPPING PURPOSES.

Application filed August 2, 1919. Serial No. 314,848.

*To all whom it may concern:*

Be it known that I, WALTER H. BECKER, a citizen of the United States, residing at Bruneau, in the county of Owyhee and State of Idaho, have invented certain new and useful Improvements in Individual Recording Devices for Shipping Purposes, of which the following is a specification.

This invention relates to an improved individual recording device for shipping purposes and has as one of its principal objects to provide a device whereby an accurate shipping record may be kept.

The invention has as a further object to provide a recording device which may itself be employed for making a record concerning the package carrying the device.

And the invention has as a still further object to provide a device which will materially simplify the recording of goods in transit since the one device attached to each package may be employed for making a record at every office through which the package passes, thus making it an easy matter to trace the package from the office of dispatch to the office of delivery.

Other and incidental objects will appear hereinafter.

In the drawings:

Figure 1 is a plan view showing my invention embodied in a shipping tag,

Figure 2 is a similar view showing a slight modification, and

Figure 3 is a plan view showing a type of record book which may be employed in connection with the invention and illustrating the manner in which records may be entered in the book.

Referring now more particularly to Figure 1 of the drawing, I have shown my invention embodied in a shipping tag 10. As is usual, the tag is formed with an eye 11 for receiving a suitable attaching cord and is provided with an appropriate space for receiving the name and address of the sender as well as the name and address of the addressee. Formed through the tag preferably adjacent its lower end is a stencil number indicated at 12. This number is the number of the shipping point or office issuing the tag. Below the shipping point number, the tag is formed with stencil date numbers indicated at 13, designating the date of issue of the tag or date of mailing from the shipping point of the package to which the tag is attached. A stencil number, indicated at 14, is also formed through the tag below the number 12 and provides an individual record number for said tag. This number indicates the consecutive order of issue of the tag.

In use, it is intended that each shipping point or office shall have an individual shipping point or office number as typified by the number 12 and as the tags are issued by each point or office, they will be provided with a current date number as typified by the number 13. Through the tags will also be provided a consecutive record number individual to each shipping point or office as typified by the number 14. Thus, upon the issue of a tag, as for instance the tag 10, the tag may be employed in making, in a suitable record book 15, a record at the shipping point or office, of the package to which the tag is attached. As illustrated in Figure 3, the pages of the book may be consecutively dated and each page will be provided with a space headed packages received and a similar space headed packages sent. Further, each shipping point or office will be provided with one of the record books and may thus, by positioning each tag issued upon the proper page of the book and in such manner that the stencil numbers will be disposed in the desired position within the proper space of the page, stencil a record of each package in the book. Similarly, a record in the book may be made of each package received by every shipping point or office, as typically suggested at the right of the sending entry of Figure 3. Therefore, after a tag has been issued by any one office and is attached to a package the one tag may be employed in making the record of the package at the shipping office and also at every shipping point through which the package passes. Consequently, should it become necessary, the package may be easily traced.

In Figure 2 of the drawings, I have illustrated a slight modification of the invention as embodied in a shipping tag 16. In this modification, the numbers indicated at 17, 18 and 19 each respectively correspond to the numbers indicated at 12, 13 and 14 of the preferred construction, but instead of being stencil numbers, are raised from the tag so that the numbers 17, 18 and 19 may be employed for making an impression in a record book. Otherwise, this modification is identical with the preferred form of the invention. However, in this connection it should be observed that I do not wish to be limited to the specific embodiment of the invention in a shipping tag since, as will be understood, the invention may well be embodied in an envelope or other similar container or could be embodied in any appropriate article adapted for attachment to a package or bill of goods. I, therefore, reserve the right to all such variations as may fall within the spirit of the appended claims.

Having thus described the invention, what is claimed as new is:

1. A shipping tag provided with a space for an address, a permanent record producing symbol denoting the sending office placed adjacent one edge of the tag, other symbols denoting the sending date and the individual number of the tag placed between said edge and the first symbol.

2. A shipping tag provided with a space for an address, a permanent stenciled record producing symbol denoting the sending office placed adjacent one edge of the tag, other symbols denoting the sending date and the individual number of the tag placed between said edge and the first symbol.

3. The method of recording articles of transit consisting in the use of tags provided with permanent stencil symbols indicating the sending office and positioned adjacent one edge of each tag; applying other stencil symbols between said edge and said first symbols on the tags, said other symbols indicating the individual number of each tag and the sending date, and producing copies by stenciling from said symbols.

4. The method of recording articles of transit consisting in the use of tags provided with permanent stencil symbols indicating the sending office and positioned adjacent one edge of each tag; applying other stencil symbols between said edge and said first symbols on the tags, said other symbols indicating the individual number of each tag and the sending date; in combination with the use of ledgers having sending and receiving columns and reproducing said symbols by stenciling in the appropriate column of the ledgers for identification.

In testimony whereof I affix my signature.

WALTER H. BECKER. [L. S.]